US007637278B2

(12) United States Patent
Elsässer

(10) Patent No.: US 7,637,278 B2
(45) Date of Patent: Dec. 29, 2009

(54) SWITCHING VALVE AND RESPECTIVE MANUFACTURING METHOD

(75) Inventor: Alfred Elsässer, Keltern (DE)

(73) Assignee: Mahle International GmbH, Stuttgart (DE)

( * ) Notice: Subject to any disclaimer, the term of this patent is extended or adjusted under 35 U.S.C. 154(b) by 309 days.

(21) Appl. No.: 11/708,783

(22) Filed: Feb. 21, 2007

(65) Prior Publication Data

US 2007/0200080 A1 Aug. 30, 2007

(30) Foreign Application Priority Data

Feb. 24, 2006 (DE) ...................... 10 2006 009 155

(51) Int. Cl.
*F16K 1/22* (2006.01)

(52) U.S. Cl. .................................... 137/15.25; 251/305

(58) Field of Classification Search ................. 251/305; 137/15.25; 123/337
See application file for complete search history.

(56) References Cited

U.S. PATENT DOCUMENTS

| | | | | |
|---|---|---|---|---|
| 5,177,866 | A * | 1/1993 | Bennett et al. | 29/890.127 |
| 5,794,591 | A | 8/1998 | Kalebjian et al. | |
| 6,502,397 | B1 | 1/2003 | Lundqvist | |
| 6,612,325 | B2 * | 9/2003 | Rentschler et al. | 137/15.25 |
| 6,662,772 | B1 | 12/2003 | Murphy | |
| 6,854,711 | B2 * | 2/2005 | Krause | 251/305 |
| 7,047,936 | B2 * | 5/2006 | Suzuki et al. | 123/337 |
| 7,089,663 | B2 * | 8/2006 | Arai et al. | 29/888.4 |
| 2004/0187920 | A1 | 9/2004 | Schmidt et al. | |

FOREIGN PATENT DOCUMENTS

| | | |
|---|---|---|
| DE | 43 29 526 | 3/1995 |
| DE | 101 42 452 | 3/2003 |
| DE | 698 22 944 | 4/2005 |
| DE | 10 2004 003 464 | 8/2005 |
| EP | 1 123 458 | 8/2001 |
| EP | 1 371 832 | 12/2003 |
| EP | 1 498 596 | 1/2005 |
| JP | 2001-248463 | 9/2001 |

* cited by examiner

*Primary Examiner*—John K Fristoe, Jr.
(74) *Attorney, Agent, or Firm*—Collard & Roe, P.C.

(57) ABSTRACT

The present invention relates to a switching valve (1) for controlling a gas flow in a gas line of an internal combustion engine, in particular in a motor vehicle, comprising a line section (2) for installation in the gas line, an actuator drive (3) for rotational adjustment of a butterfly valve (11) about an axis of rotation (13) running across the direction of flow inside the line section (2). In the closed position of the butterfly valve (11) a throttle sealing gap (17) is formed radially between a butterfly valve edge (16) and a sealing surface (14) facing the butterfly valve (11) and belonging to a sealing section encompassing the butterfly valve (11) along the butterfly valve edge (16) in the circumferential direction.

Figure 1:
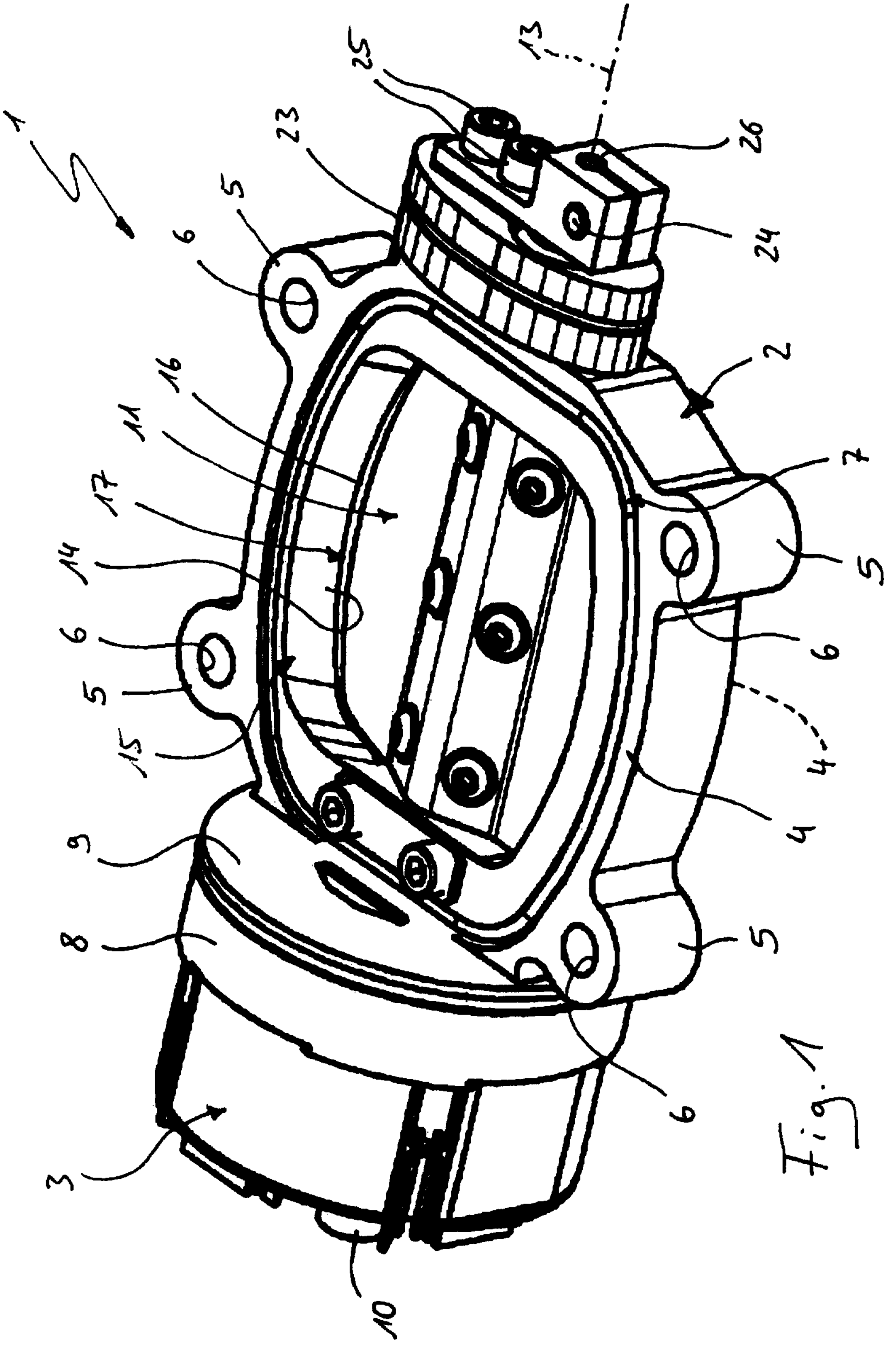

To simplify the manufacture of a high quality throttle sealing gap (17), the sealing section may be formed by a sealing body (15) which is manufactured separately from the other line section (2) and can be added directly onto the line section (2).

3 Claims, 2 Drawing Sheets

SWITCHING VALVE AND RESPECTIVE MANUFACTURING METHOD

CROSS REFERENCE TO RELATED APPLICATIONS

Applicant claims priority under 35 U.S.C. §119 of German Application No. 10 2006 009 155.8 filed Feb. 24, 2006.

The present invention relates to a switching valve for controlling a gas flow in a gas line of an internal combustion engine, in particular in a motor vehicle. The invention also relates to a method for manufacturing such a switching valve.

Such switching valves are used, for example, as throttle valves in a fresh gas line of an internal combustion engine or as air cycle valves for pulse supercharging of the internal combustion engine. With such switching valves, it is of particular interest to achieve an adequate seal on the gas line when the respective valve member, usually a valve of the switching valve, assumes its closed position, whereby at the same time the switching valves should operate with the lowest possible amount of wear. Likewise, it may be desirable to achieve the shortest possible switching times.

EP 1 498 596 A2 also describes using a throttle gap gasket in a valve arrangement for controlling a gas stream in a gas line of an internal combustion engine to minimize the leakage with the valve member adjusted into its closed position. This throttle gap gasket is formed by designing a throttle sealing gap in the closed position of the valve member designed as a butterfly valve radially between a butterfly valve edge and a sealing surface facing the butterfly valve. With the known valve arrangement the sealing surface is designed on an insertion part that encompasses the butterfly valve along the butterfly valve edge in the circumferential direction. Said insertion part has the flow cross section of the gas line and is arranged in the corresponding receptacle and thereby countersunk into the gas line. Toward the gas line the insertion part is sealed with a gasket. The insertion part is attached via this gasket to the gas line. By positioning the insertion part in relation to the butterfly valve which is in turn arranged in a stationary position with respect to the gas line, the throttle sealing gap may be adjusted and/or established. In this way it is possible to create a predetermined geometry with a relatively high position for the throttle sealing gap. The sealing effect of the throttle sealing gap is determined by the geometry, i.e., the gap length and gap width of the throttle sealing gap arranged between the butterfly valve edge and the sealing surface.

The present invention relates to the problem of providing an improved embodiment for a switching valve of the type defined in the preamble and for a respective manufacturing process so that the improved embodiment is characterized in particular in that the throttle sealing gap can be manufactured with a high precision, while at the same time the manufacturing costs remain relatively low.

This problem is solved according to this invention by the subjects of the independent claims. Advantageous embodiments are the subject of the dependent claims.

The present invention is based on the general idea of manufacturing, i.e., designing the throttle sealing gap only as part of the fabrication of the butterfly valve and/or the sealing section having the sealing surface, whereby the butterfly valve and the sealing section are in a relative or ideal position in relation to one another during the manufacturing, i.e., development of the throttle sealing gap such that the position assumed by the valve and the sealing section are also assumed in relation to one another in the completely installed switching valve. Due to this design, the desired geometry for the throttle sealing gap can be produced with a relatively high quality, while at the same time the complexity required for this is comparatively low because with the embodiment and production of the throttle sealing gap, the butterfly valve and the sealing section are in the ideal position in relation to one another. To certain extent, manufacturing tolerances of the sealing section and of the butterfly valve can be more or less eliminated.

The manufacture of a sealing body which forms the sealing section separately from the remaining line section is especially advantageous here. This separate sealing body may form a module together with the butterfly valve independently of the remaining line section of the switching valve such that the components of this module, i.e., the butterfly valve and the sealing body can be positioned in the aforementioned ideal position in relation to one another for the production, i.e., development of the throttle sealing valve, which simplifies the manufacture of a precise throttle sealing valve.

Additional important features and advantages of the invention are derived from the subclaims, the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the present invention are depicted in the drawings and explained in greater detail in the following description, whereby the same reference numerals refer to the same or similar or functionally identical components.

Figure 2:
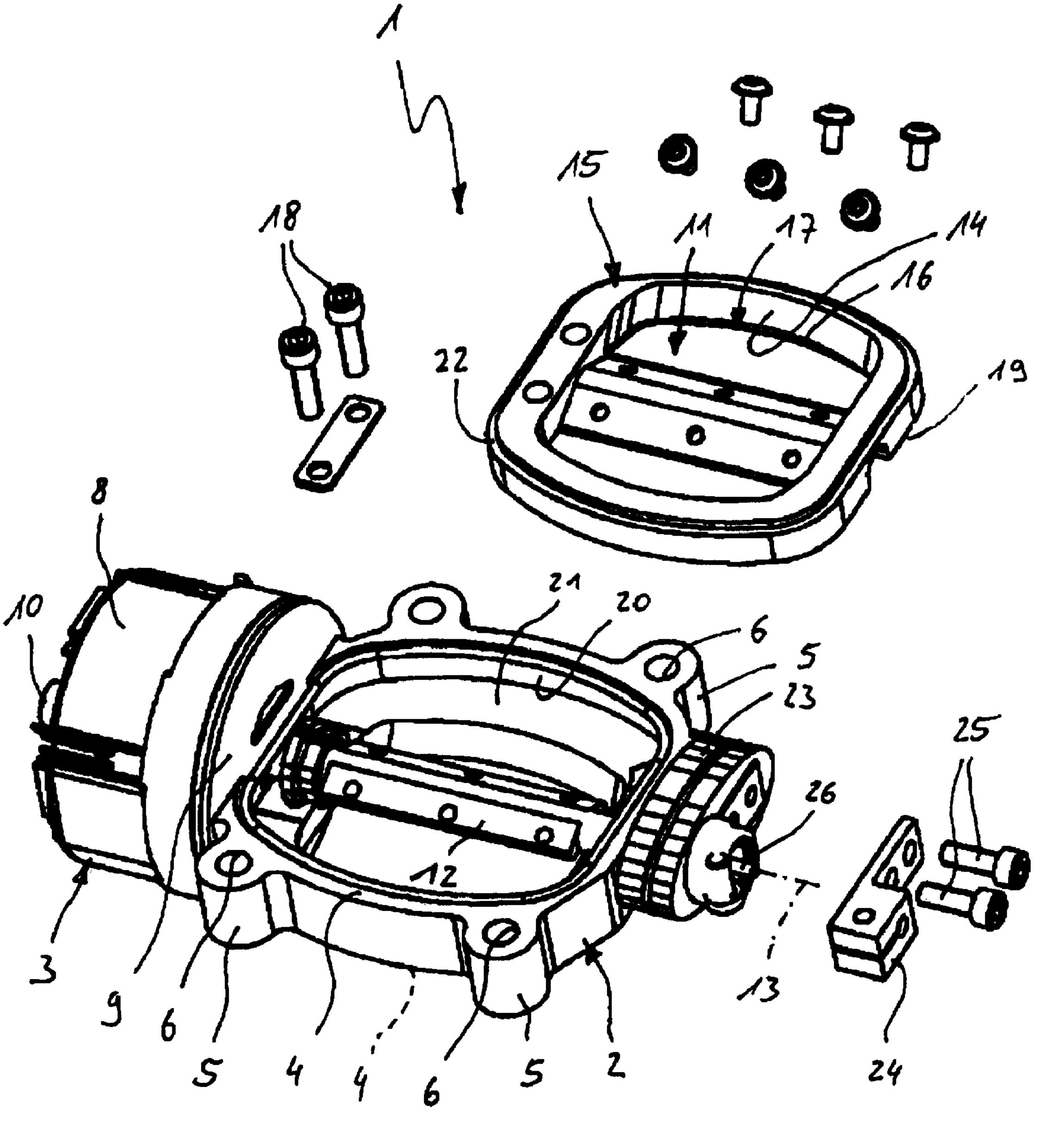

The drawings show in schematic diagrams:

FIG. 1 a perspective view of a switching valve,

FIG. 2 a view like that in FIG. 1 but in an exploded diagram and from a different angle of view.

According to FIGS. 1 and 2, a switching valve 1 that is used for controlling a gas flow in a gas line (not shown here) of an internal combustion engine, preferably in a motor vehicle, comprises a line section 2 and an actuator drive 3. The line section 2 is equipped for installation in said gas line. For example, the line section 2 is therefore designed as an axial section of the gas line which can be inserted into an axial interruption in the gas line provided for this purpose and then forms a component of the gas line with regard to carrying the gas. In the embodiment shown here the line section 2 has two axial flange sides 4, only one of which is facing the viewer. At least one of these end faces 4 is designed to be essentially planar and is in a plane extending perpendicular to the direction of flow, i.e., perpendicular to the axial or longitudinal direction of the line section 2 and thus the gas line in the area of the switching valve 1. With the embodiment shown here, the line section 2 is equipped with four eyes 5 which are spaced a distance apart from one another in the circumferential direction and protrude outward laterally and contain the axially oriented through openings 6.

In the installed state, the flange sides 4 come to rest axially against suitably designed flanges on the gas line. With the help of the eyes 5, the line section and thus the entire switching valve 1 can be attached to said flanges of the gas lines. For example, the through openings 6 then have screws or bolts passing through them.

At least one of the flange sides 4 is provided with an axially open groove 7 which runs in a closed form in the circumferential direction. The groove 7 serves to receive an axial gasket (not shown here) which cooperates in the installed state with a corresponding sealing surface of the adjacent aforementioned flange.

The actuator drive 3 has a housing 8, at least one component of which, e.g., a housing bottom labeled as 9, is integrally designed on the line section 2. For example, the line section 2 may be an injection molded plastic part. Integration of at least the housing bottom 9 into the line section 2 lowers the manufacturing cost of the switching valve 1.

The actuator drive 3 is an electromagnetic actuator, for example. Corresponding electric terminals are partially discernible in the figures and are labeled as 10. The actuator drive 3 provides a rotating actuation of a control member designed here as a valve 11, in particular as a so-called butterfly valve. To this end, the actuator drive 3 is drive connected to a drive shaft 12, for example, as shown in FIG. 2, so that the actuator drive 3 can drive the drive shaft about an axis of rotation 13 running across the direction of flow or the axial direction. The butterfly valve 11 is attached to the drive shaft 12 in a rotationally fixed manner. The actuator drive 3 can adjust the butterfly valve 11 at least between a closed position as shown in the figures and an open position, preferably offset 45° from the closed position. In its closed position, the butterfly valve 11 locks the flow cross section of the line section 2, whereas it mostly releases the flow cross section when in its open position.

In a preferred embodiment, the switching valve 1 is designed as an air cycle valve that is provided for installation in a fresh gas line of the internal combustion engine. With the help of such an air cycle valve 1, a pulsed charging of the internal combustion engine can be achieved by utilizing dynamic flow processes. To this end, extremely short switching times are required for the air cycle valve, i.e., switching valve 1. Accordingly, the actuator drive 3 is preferably designed as a high-speed actuator device with the help of which switching times of less than 5 ms, in particular less than 3 ms, can be achieved between the closed position and the open position of the butterfly valve 11.

To be able to effectively block the flow cross section designed in the line section 2 in the closed position of the valve 11, a throttle sealing gap 17 is formed radially between a sealing surface 14 facing the butterfly valve 11 of a sealing section 15 of the line section 2 and a butterfly valve edge 16 of the butterfly valve 11 adjusted into the closed position. The sealing section 15 encompasses the butterfly valve 11 along its butterfly valve edge 16 in the circumferential direction. The throttle sealing gap 17 creates a more or less effective throttle effect for a gas flow which seeks to flow around the butterfly valve 11 at its butterfly valve edge 16 and is defined so mainly by a radially measured gap width and an axially measured gap length. Such a throttle valve gasket 17 thus operates without contact, at least in the radial direction. The butterfly valve edge 16 is radially opposite the sealing surface 14 in the closed position of the butterfly valve 11 without a continuous force acting between the butterfly valve edge 16 and the sealing surface 14. In an especially advantageous embodiment, no stop against which the valve 11 could come to rest in its closed position is formed between the butterfly valve 11 and the sealing section 15. The butterfly valve 11 thus also operates without contact in the axial direction. On the whole, this yields an extremely low-friction and low-wear operation for the butterfly valve 11. A stop to define the closed position and/or open position, for example, may be provided internally in the actuator drive 3.

With the preferred embodiment shown here, the line section 2 comprises a sealing body which forms the sealing section 15 and is therefore also labeled as 15 below. Sealing body 15 forms an independent component and is manufactured separately from the other line section 2. In the installed state, sealing body 15 is fixedly mounted directly on the line section 2. For example, sealing body 15 is attached to the line section 2 with the help of two screws 18.

To be able to provide the throttle sealing gap 17 with a particularly high precision with regard to its geometry, it is preferably manufactured by machining and/or shaping the butterfly valve 11 and/or the sealing surface 14, namely within the sealing section 15 and/or within the sealing body 15. In other words, the throttle sealing gap 17 is formed only on completion of the butterfly valve 11 and/or sealing surface 14. Separate manufacturing tolerances for the butterfly valve 11 and the sealing section and/or sealing body 15 are therefore compensated with regard to the manufacturing tolerance of the throttle sealing gap 17.

In a preferred embodiment, the butterfly valve 11 is first prefabricated, whereby the butterfly valve 11 still does not have its final shape in particular in the area of its butterfly valve edge 16. The butterfly valve 11, which is unfinished to this extent is positioned in the sealing section 15 and/or in the sealing body 15, namely in a predetermined relative position or ideal position. In this regard the butterfly valve 11 and the sealing section 15 and/or sealing body 15 are to be coordinated with one another so that the distance prevailing radially between the butterfly valve edge 16 and the sealing surface 14 in this starting state is reduced with respect to the throttle sealing gap 17 and/or its gap width which is yet to be established. In particular the butterfly valve edge 16 may come in contact with the sealing surface 14 and/or overlap with it at least in some areas. While retaining the ideal position between the butterfly valve 11 and the sealing section 15 and/or sealing body 15, the throttle sealing gap 17 is now produced by machining the butterfly valve edge 16 and/or the sealing surface 14. For example, the throttle sealing gap 17 is cut free by cutting the butterfly valve edge 16 and/or sealing surface 14. For example, a laser cutting method or a water jet cutting method is conceivable.

In another embodiment, the butterfly valve 11 may be manufactured by injection molding, for example, in particular from plastic. The sealing surface 14 may form a wall section in a casting mold for injection molding of the butterfly valve 11, where the wall section serves to border the butterfly valve edge 16. Casting parameters such as the temperature and pressure and the material of the butterfly valve can preferably be selected so that the throttle sealing gap 17 is formed automatically on solidification of the injected butterfly valve material, namely due to shrinkage of the cooling butterfly valve material.

As an alternative, the sealing surface 14 may also be manufactured by injection molding, whereby then the butterfly valve 11 and/or its butterfly valve edge 16 then forms a wall section that serves to border the sealing surface 14 in a casting mold for injection molding of the sealing surface 14. Here again, the casting parameters and the material used can be selected so that the throttle sealing gap 17 is formed automatically on solidification.

In another variant the prefabricated but not yet finally finished butterfly valve 11 may be positioned in a predetermined relative position or ideal position in the sealing section 15 and/or sealing body 15. The unfinished butterfly valve and the sealing section 15 and/or the sealing body 15 are preferably coordinated so that in this starting state there is a distance between the butterfly valve edge 16 and the sealing surface 14 that is larger than the throttle sealing gap 17 and/or it gap width which is yet to be established. The butterfly valve 11 positioned in this way can then be finally molded by targeted heating and plastic molding such that the flap edge 16 moves in the direction of the sealing surface 14. With this shaping operation, the throttle sealing gap 17 is formed at the same time. Such a shaping operation can be implemented by so-called hot press molding, for example. It is also possible to perform the heating of the section to be shaped by means of ultrasound.

In addition, it is fundamentally possible to design the sealing body 15 so that is can be used as a punching tool for punching out the valve 11 from a sheet of material. The sealing body 15 then has a corresponding cutting edge. In addition, the sealing body 15 has a cross sectional enlargement following the cutting edge which is of such dimensions that the butterfly valve 11 punched out with the sealing body 15 then automatically forms the desired throttle sealing gap 17 with respect to the sealing surface 14 in the sealing cross section intended here.

In addition, other methods are also conceivable for manufacturing, i.e., forming the throttle sealing gap 17. For example, use of an abrasive material combination is also possible, where a hard abrasive material grinds into a soft grindable material to thereby form the throttle sealing gap. Such a method is disclosed in EP 1 498 596 A2, for example, which was already cited above and which is herewith incorporated by explicit reference to the disclosure content of the present invention.

As explained, the throttle sealing gap 17 can be designed directly inside the line section 2 if the sealing section 15 forms an integral component of the line section 2. For the preferred case when the sealing section 15 is formed by the sealing body 15 that is separable with respect to the line section 2, then the throttle sealing gap 17 can be manufactured separately from the other line section 2 within the ideal position arrangement of the butterfly valve 11 and the sealing body 15. This may be advantageous with respect to the accessibility of the butterfly valve edge 16, the sealing surface 14 and/or the throttle sealing gap 17.

After manufacturing the throttle sealing gap 17, the butterfly valve 11 and the sealing body 15 can be added on to the remaining switching valve 1. As shown here the sealing body 15 is preferably attached to the line section 2. For example the butterfly valve 11 may be bolted onto the drive shaft 12. Likewise other fastening measures are also conceivable. Accordingly, the butterfly valve 11 is a component manufactured separately from the drive shaft 12 and is added onto it in the installed state.

To be able to guarantee the high quality of the throttle sealing gap 17 in the installed state of the butterfly valve 11 and sealing body 15 as well, in a preferred embodiment, it is possible to provide for a flow carrying inside cross section of the remaining line section 2 to design a flow carrying inside cross section of the remaining line section 2 with a bevel or to be larger, especially slightly, at least in an axial area adjacent to the sealing body 15? than the flow carrying inside cross section of the sealing body 15. It is possible in this way to prevent collisions, e.g., between the butterfly valve edge 15 and the remaining line section 2.

In the preferred embodiment shown here, the sealing body 15 has an axial end face 19 facing away from the observer (see FIG. 2). This end face 19 is preferably designed to be planar and is in a parting plane on the line section 2 which is not identified further. The axis of rotation 13 is situated in said parting plane. In the closed position, a central plane of the butterfly valve 11 is also situated in the part of the plane. The line section 2 has a corresponding recess 20 which has a supporting side 21 that is complementary to the end face 19 to receive the sealing body 15.

In the embodiment shown here, it is also noteworthy that a step 22 running radially on the outside in the circumferential direction is formed on an axial end face which faces the viewer but is not identified further here, said peripheral step bordering the groove 7 axially and on the inside radially in the installed state according to FIG. 1. The groove 7 is thus bordered by a wall (not identified further here) of the recess 20 of the line section 2 only on the outside radially. The axial end face of the sealing body 15 facing the observer preferably extends in a plane, in particular in the same plane as the flange side 4 of the line section 2 facing the observer.

A bearing section 23 in which an end of the drive shaft 12 at a distance from the actuator drive 3 is rotatably mounted is integrally molded on the line section 2 in an area at a distance from the actuator drive 3. The bearing section 23 is designed to be comparatively rigid to be able to absorb relatively high torques with respect to the axis of rotation 13 without resulting in any significant deformation of the line section 2. The bearing section 23 carries a holder 24 which is secured by means of screws 25, for example, to the bearing section 23. The holder 24 serves to rotationally secure a torsional spring rod 26 that extends coaxially with the axis of rotation 13. The torsion spring rod 26 extends coaxially inside the drive shaft 12, which is therefore designed as a hollow shaft. The drive shaft 12 is connected to the torsion spring rod 26 in a rotationally fixed manner in an area at a distance from the bearing section 23. The torsion spring rod 26 has its neutral position centrally between the closed position and the open position of the butterfly valve 11 and serves as a restoring device for the actuator drive 3. The torsion spring rod 26 supplies potential energy in each end position of the actuator drive 3, i.e., in the closed position and in the open position of the butterfly valve 11, this energy allowing a great acceleration of the butterfly valve 11 at the start of each reversing phase.

The invention claimed is:

1. A method for manufacturing a switching valve for controlling a gas flow in a gas line of an internal combustion engine, whereby the switching valve has a line section for installation in the gas line and an actuator drive for rotational adjustment of a butterfly valve about an axis of rotation running across the direction of flow inside the line section, whereby in a closed position of the butterfly valve a throttle sealing gap is formed radially between a butterfly valve edge and a sealing surface of a sealing section which faces and encompasses the butterfly valve along the butterfly valve edge in the circumferential direction, whereby the throttle sealing gap is manufactured by manufacturing and/or shaping and machining the butterfly valve and/or the sealing surface within the sealing section;

wherein the butterfly valve is positioned in a predetermined relative position in the sealing section after its manufacture, whereby the butterfly valve and the sealing section are coordinated with one another so that in this starting state, an enlarged distance prevails radially between the butterfly valve edge and the sealing surface with respect to the throttle sealing gap; and wherein the throttle sealing gap is produced by heating and plastic deformation of the positioned valve.

2. The method according to claim 1 wherein a sealing body forming the sealing section is manufactured separately from the remaining line section and is added on to the line section only after manufacturing the throttle sealing gap.

3. The method according to claim 2, wherein the sealing body is designed so that it can be used for punching out the butterfly valve from sheeting material.

* * * * *